UNITED STATES PATENT OFFICE.

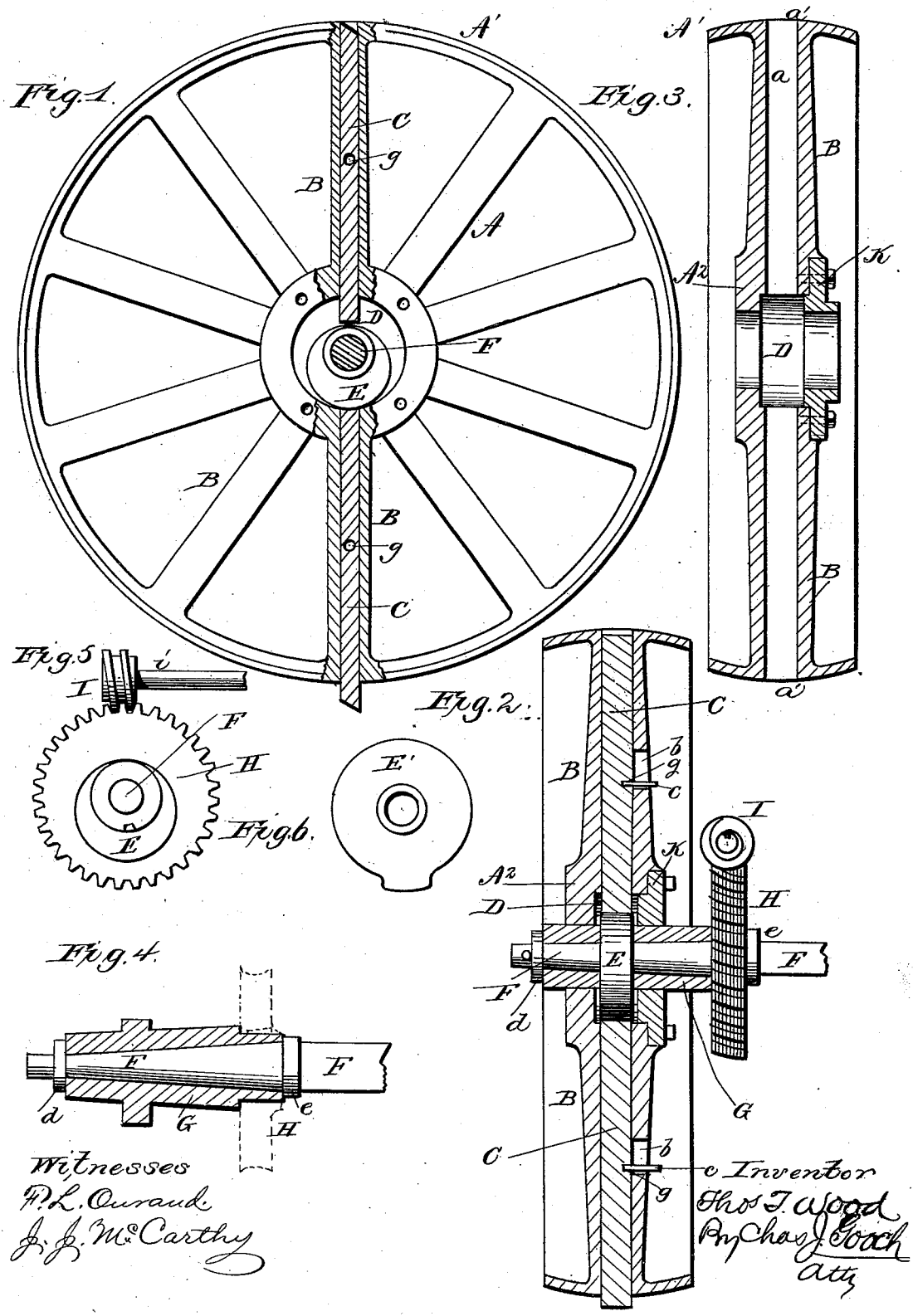

THOMAS T. WOOD, OF SAC CITY, IOWA, ASSIGNOR OF ONE-FOURTH TO LEVI DAVIS, OF SAME PLACE.

TRACTION-WHEEL.

SPECIFICATION forming part of Letters Patent No. 247,792, dated October 4, 1881.

Application filed April 30, 1881. (No model.)

*To all whom it may concern:*

Be it known that I, THOS. THEODORE WOOD, a citizen of the United States, residing at Sac City, in the county of Sac and State of Iowa, have invented certain new and useful Improvements in Traction-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in traction-wheels; and it consists in a novel construction and arrangement of parts, hereinafter described and claimed.

In the drawings, Figure 1 is a side elevation, partly in section, of my improved wheel. Fig. 2 is a vertical section thereof. Fig. 3 is a vertical section of the wheel with the operating mechanism removed. Fig. 4 is a side view, partly in section, of the devices for operating the sliding bars. Fig. 5 is an end view of Fig. 4. Fig. 6 shows a modified form of cam for operating the sliding bars.

A represents my improved wheel.

B represents the spokes, all or part of which are formed hollow throughout their length, and are either cast integrally with the flange or rim A' and hub $A^2$, or are formed separately and secured thereto in any of the well-known ways.

C represents traction-bars, which are inserted within the hollow portion $a$ of the spokes B, and slide loosely therein and out of the orifices $a'$ in the flange A', as hereinafter described.

Each spoke B, within which a bar, C, is contained, is slotted at $b$. A pin, $c$, passes through said slot and engages with a hole, $g$, in the bar. The slot $b$ and pin $c$ allow the bar C to slide vertically within said spoke, and said pin at the same time holds it securely therein and prevents it falling out too far. Said pin also tends to draw the bar down toward the cam when the wheel revolves upwardly.

The hub $A^2$ is formed with a recess, D, to receive the inner ends of the bars C when retracted, as they will automatically be on the upward movement of that part of the wheel from which the outer ends protrude, and also to receive the cam E, for operating upon the ends of the bars to project them outward.

F is the axle, upon which is loosely mounted a sleeve, G, to which is keyed at one end a tangent-wheel, H, which is rotated by means of a screw-wheel, I.

$d$ $e$ are collars upon the axle, which rest against the sleeve G at either end to retain it in position. The cam E is mounted upon the sleeve G, and is retained within the recess D of the hub by means of a flange, K, bolted to the side of the hub $A^2$.

In Figs. 2 and 4, I have represented the cam as having a milled edge to facilitate its engagement with the ends of the bars C; but its edge may be plain and of either of the shapes shown in the drawings, or of any other desired shape, according to the number of bars C contained in the wheel or the number to be operated.

The cam E may be loosely mounted upon the sleeve G with capability of rotation thereon for adjustment in position, as desired, in which event it may be secured in the desired position by means of a screw or pin passing therethrough and into the sleeve G; or said cam may in the first instance be rigidly secured to the sleeve.

The operation of the device is as follows: When it is desired to adjust the cam E or change its position, the screw-wheel I, which is mounted on a short shaft, $i$, is rotated the required distance. The screw on the wheel I, meshing with the tangent-wheel H, then causes the sleeve G, and the cam E attached thereto to rotate to the position desired for operating upon the bars C. Then, on the wheel A being rotated by the movement of the engine or vehicle to which the wheel is applied, the cam will operate to push out of the hollow spokes B, as they come to the ground, the bars C, which it is desired to project from the wheel for engagement with the ground over which the vehicle or engine is traveling. The pins $c$, passing through the slots $b$ in the spokes and engaging with said bars, will prevent the bars slipping out too far when in operation, and will also tend to draw them down within the hollow spokes upon the upward rotation of the wheel, thereby causing any earth that may adhere to the outer ends of the bars to be scraped off by the sides of the orifice $a'$ in the rim or flange of the wheel.

I am aware that traction-wheels have been constructed with a slotted disk, within which slide pins carried by arms to which are attached shoes, to form a portable track as the wheel rotates, said shoe-carrying arms being projected downward at the proper time by an eccentric. I am also aware that a wheel has been constructed with radial arms pivoted at one end to a central disk, and at the other end to short arms, which are adapted to project out from the flange of the wheel. I am also aware that it is not new to mount upon a shaft an eccentric for forcing traction-wheel arms out from the wheel, nor is it new to employ a tangent and screw for adjusting such shaft. I am further aware that traction-wheels have been constructed with hollow tubes additional to the ordinary spokes, in which hollow tubes are contained spiral springs, whose office it is to force out from such tubes arms carrying feet or shoes which rest upon the ground. I am not, however, aware of any traction-wheel having an enlarged hub, hollow spokes, traction-bars held loosely within said spokes by the means described, and forced outward and into the ground by a cam, said cam being mounted upon a sleeve and capable of adjustment, and said bars being capable of automatic retraction within the spokes and enlarged hub, in the manner set forth.

What I claim as my invention is—

1. In a traction device, the wheel A, having flange A', perforated at $a'$, hollow spokes B, slotted at $b$, and extending to the rim of the wheel, hub $A^2$, having recess D, and flange K, in combination with the cam E, sleeve G, and the bars C, secured within said spokes by a removable pin, $c$, and adapted to slide loosely therein and be forced into the ground, substantially as and for the purpose set forth.

2. A traction device consisting of wheel A, having perforated flange A' $a'$, hollow spokes B, slotted at $b$, recessed hub $A^2$ D, and flange K, bars C, adapted to slide within the spokes and be forced in the ground, sleeve G, tangent-wheel H, screw I, cam E, and removable pin $c$, for engaging with the bars C, as and for the purpose set forth.

In testimony whereof I affix my signature in presence of two witnesses.

THOS. THEODORE WOOD.

Witnesses:
   JHON ROSSE,
   JAS. V. MILLER.